July 19, 1955 — J. J. DOMOJ — 2,713,287

EXPLOSIVE ACTUATED LATCHES

Filed Aug. 30, 1951

INVENTOR.
JOHN J. DOMOJ
BY
ATTORNEYS

United States Patent Office 2,713,287
Patented July 19, 1955

2,713,287

EXPLOSIVE ACTUATED LATCHES

John Joseph Domoj, Camarillo, Calif.

Application August 30, 1951, Serial No. 244,449

6 Claims. (Cl. 89—1.5)

(Granted under Title 35, U. S. Code (1952), sec. 266)

The invention described herein may be manufactured and used by or for the Government of the United States of America for governmental purposes without the payment of any royalties thereon or therefor.

This invention relates to improvements in latches, and more particularly pertains to improvements in explosive-actuated latches for the release of aircraft-borne loads.

In the operation of aircraft it is desirable to carry loads such as bombs, gliders, fuel tanks or other jettisonable cargoes that are to be dropped in varying attitudes of flight. Present aircraft loading and releasing mechanism endeavor to attain speedy, facile and positive methods of loading and releasing such cargo by means of one or more clamping jaws that grip the structure to be jettisoned and release such structure by means of mechanism that is operated electrically or mechanically. In loading with a typical single-lug clamp as the retaining means, a cargo such as a bomb is mounted on a cradle which in turn is mounted upon a box-like structure that houses the hoisting equipment. Cargo, cradle and support are transported to the aircraft loading bay by dolly and cables, and pulleys are employed to hoist the three elements until the release member of the bomb grips the bomb lug. The box-like structure and cradle are then lowered and removed.

There are several disadvantages inherent in such loading means. The supporting structure and the cradle comprise a weight of one and one-half to two tons which must be lifted. The devices employed include a multiplicity of moving parts that are subject to freezing and fouling under adverse weather conditions, thereby preventing the releasing mechanism from operating properly. Erratic operation can also stem from electrical or mechanical failure of the equipment. The release mechanisms of the types described are heavy, being of the order of forty pounds for a load of five tons. The equipment is large and bulky, and loading operations require the services of four to eight men.

The principal object of this invention is to provide an explosive-actuated latch for the release of aircraft-borne loads that is simple in construction, uniformly positive in operation, and an improvement over latching devices heretofore employed.

Another object is to provide an explosive-actuated latch for the release of aircraft-borne loads affording simplicity in the loading of heavy cargo, ease of manufacture and maintenance, and freedom from the likelihood of electrical or mechanical malfunction that characterizes latches heretofore employed.

Other objects and many of the attendant advantages of this invention will be readily appreciated as the same becomes better understood by reference to the following detailed description when considered in connection with the accompanying drawing wherein.

Similar numerals refer to similar parts throughout the several views.

Figure 1:
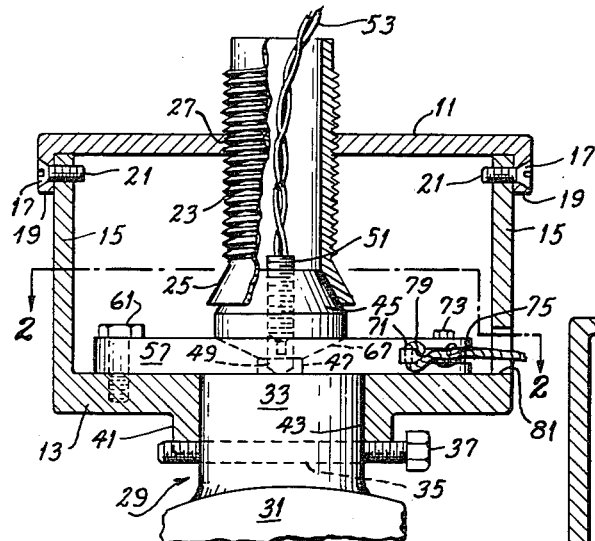
Fig. 1 is a sectional elevation of an explosive-actuated latch for the release of aircraft-borne loads, partly broken away to show details of structure, showing a preferred embodiment of the invention.

The housing of the subject latching device comprises a box that includes an upper plate member 11, a carrying plate 13 and side walls 15, said member 11 being secured removably to the walls 15 by means of a plurality of screws 17 that extend through depending flanges 19 of said member 11 and into threaded bores 21 in said walls. The housing is secured rigidly to the aircraft frame by suitable means not shown.

Threaded tubular member 23 is a guide and stop element, and has a conical base portion 25 adapted to be seated on the attachment lug hereinafter described. Said member is carried in a threaded bore 27 in upper plate member 11. An attachment lug 29 is affixed to the load 31 as by welding. Said lug is provided with a cylindrical body portion 33 having a transverse threaded bore 35 adapted to receive a stop screw 37. Said stop screw 37 will lie in a dished groove 39 of the nether flange 41 that defines bore 43 of carrying plate 13 when said lug is in secured position. Said lug is also provided with a conical head portion 45 adapted to abut the nether face of the base portion of member 23, and a neck portion 47, of appreciably reduced diameter, intermediate head portion 45 and body portion 33. Threaded axial bore 49 extends into said lug from the top end of head portion 45 to a depth including the depth of neck portion 47 from said top end. Charged breech 51 is adapted to be threaded into said bore 49 and carries conductors 53 whereby said breech can be detonated by electric current from a suitable source (not shown) conducted therethrough.

A pair of clamping jaws 55 and 57 are carried rotatably on the carrying plate 13 by bolts 59 and 61 respectively, said bolts passing through bores proximate an end of each of said jaws into threaded bores in said plate. Each of said jaws is provided with a recessed and dished central portion, 63 and 65 respectively, said portions encircling the neck portion 47 and providing a seat for the conical portion 67 of the lug 29 when the jaws are in closed position. Jaw 55 is further provided with a slot 69 in the end thereof distal bolt 59 wherein a release latch 71 is carried rotatably by bolt 73. Slot 75 in the end of jaw 57 that is distal bolt 61 is adapted to receive the body of latch 71 when said jaws are in closed position, the tongue 77 of said latch engaging the side wall of jaw 57 to retain said jaws in closed position. Lanyard 79 is secured to said latch proximate the tongue 77 thereof and extends through a slot 81 in the wall 15.

Figure 2:
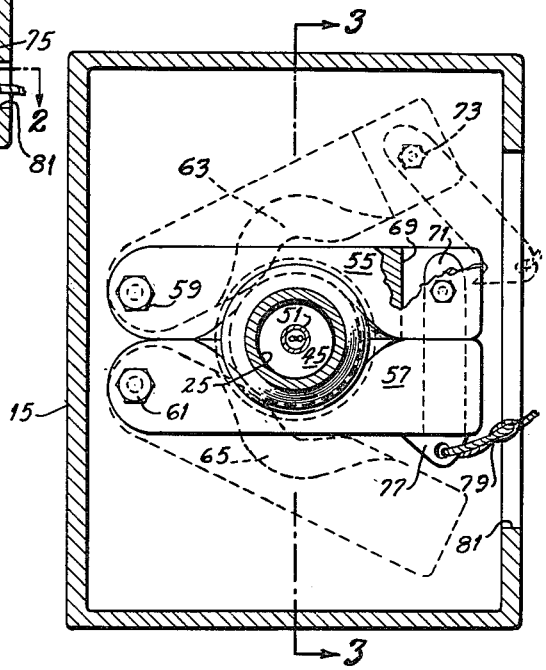
Fig. 2 is a section taken on the line 2—2 of Fig. 1, partly broken away to show details of structure and showing the clamps and release latch of the device in dotted lines to illustrate the open position of said elements.
Figure 3:
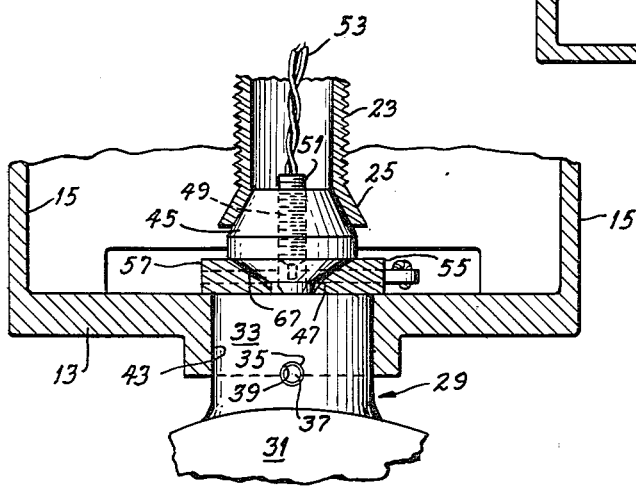
Fig. 3 is a section taken on the line 3—3 of Fig. 2.

In the operation of the device, a suitable hoisting rig (not shown) is positioned over the upper plate member 11. Said rig is aligned for operation by means of the tubular member 23, a cable and a grip such as a clevis and hoisting link (not shown) being lowered through member 23 until such link can be threaded into bore 49 of the attachment lug 29. When the lifting mechanism has elevated the load to carrying position, with the attachment lug body portion 33 lying in bore 43, the jaws 55 and 57 are rotated from the dotted line position shown in Fig. 2 to the solid line position shown in that figure, said jaws thereby gripping the attachment lug at the neck portion 47 thereof. The latch 71 is then closed, into slot 75, the clevis and hoisting link of the hoisting rigging removed, the member 23 tightened down over the conical head portion 45 of said lug, and the stop screw 37 inserted into said lug to lie partly in groove 39 so as to prevent rotation of said lug. The charged breech 51 is then screwed into the bore 49, said breech being adapted to be discharged electrically through conductors 53 to rupture the lug 29 at the neck portion 47 thereof and thereby release the load. Upper plate member 11 and member 23 afford protection for the surrounding area against damage consequent the explosion of the charge and release of the load.

In case of misfire by the explosive or failure of the explosive to break the neck of the lug, the load can be released manually by pulling lanyard 79, which releases latch 77 from slot 75 and rotates jaw 55 away from its closed position. Separation of said jaws and release of the load is also aided by the weight of the load bearing against the dished surfaces 63 and 65 of said jaws.

The advantages of the subject device are evident from the foregoing description of structure and function. The device can be operated electrically or mechanically, only two to four men being required to accomplish loading. The device is comparatively light in weight, as it need be only of the order of twenty pounds for handling a load of 15 tons. It has a minimum of moving and complex parts and consequently can be manufactured easily and relatively inexpensively. Positive performance is assured by the release means employed, regardless of the type and size of load involved. Finally, smaller capacity loading equipment can be employed as only the lug and the cargo must be elevated in the loading operation.

Obviously many modifications and variations of the present invention are possible in the light of the above teachings. It is therefore to be understood that within the scope of the appended claims the invention may be practiced otherwise than as specifically described.

I claim:

1. An aircraft load release assembly comprising a housing including a carrying plate adapted to be secured to the frame of an aircraft, aligned bores in said plate and said housing, a cylindrical attachment lug having an annular groove proximate one end and a threaded axial bore in said end adapted to be carried in the bore in said plate, a pair of clamping jaws mounted rotatably on said plate and adapted to engage said lug at said groove, means to latch said clamping jaws together, means to release said latching means, a charged breech carried in said bore in said lug and adapted to fracture said lug at said groove when fired, means to fire said breech, and a guide and stop member threaded in said bore of said housing and seated upon said end of said lug.

2. An aircraft load release assembly comprising a housing having a lower plate member adapted to be secured to the frame of an aircraft, said plate member having a bore therethrough, an attachment lug having a weakened neck portion proximate one end and a threaded axial bore in said end, said lug being adapted to be carried in the bore in said plate member, a pair of clamping jaws carried rotatably on said plate member to secure said lug at said neck portion to said housing, a charged breech carried in said bore in said lug and adapted to break said lug at said neck portion when fired, and means to fire said breech.

3. An aircraft load release assembly comprising a housing having a lower plate member adapted to be secured to the frame of an aircraft, said plate member having a bore therethrough, an attachment lug having a weakened neck portion proximate one end and a threaded axial bore in said end, said lug being adapted to be carried in the bore in said plate member, a pair of clamping jaws carried rotatably on said plate member to secure said lug at said neck portion to said housing, a latch carried by one of said jaws and engageable with the other of said jaws to secure the grip of said jaws around said neck portion, a charged breech carried in said bore in said lug and adapted to break said lug at said neck portion when fired, and means to fire said breech.

4. An aircraft load release assembly comprising a housing having a lower plate member adapted to be secured to the frame of an aircraft, said plate member having a bore therethrough, an attachment lug having weakened neck portion proximate one end and a tapered head having a threaded axial bore at said end, said lug being adapted to be positioned in the bore in said plate member, a pair of clamping jaws carried rotatably on said plate member to secure said lug at said neck portion to said housing, a latch carried by one of said jaws and engageable with the other of said jaws to secure the grip of said jaws around said neck portion, a charged breech carried in said bore in said lug and adapted to break said lug at said neck portion when fired, means to fire said breech, and a retaining member threaded into said housing and adapted to be seated upon said head.

5. An aircraft load release assembly comprising a housing having a lower plate member adapted to be secured to the frame of an aircraft, said plate member having a bore therethrough, an attachment lug having a weakened neck portion proximate one end and a tapered head at said end, said head having a threaded axial bore extending through said head and into said neck portion, said lug being adapted to be positioned in the bore in said plate member, means to secure said lug against rotation relative said housing, a pair of clamping jaws carried rotatably on said plate member to secure said lug at said neck portion to said housing, a latch carried by one of said jaws and engageable with the other of said jaws to secure the grip of said jaws around said neck portion, a charged breech carried in said bore in said lug and adapted to break said lug at said neck portion when fired, means to fire said breech, and a guide and stop member threaded into said housing and adapted to be seated upon said head.

6. An aircraft load release assembly comprising a housing having a lower plate member adapted to be secured to the frame of an aircraft, said plate member having a bore therethrough, an attachment lug having a weakened neck portion proximate one end and a tapered head at said end, said head having a threaded axial bore extending through said head and into said neck portion, said lug being adapted to be positioned in the bore in said plate member, means to secure said lug against rotation relative said housing, a pair of clamping jaws defining, when juxtaposed, a dished annular seat, said jaws being carried rotatably on said plate member to secure said lug at said neck portion with said head seated on said dished seat, a latch carried by one of said jaws and engageable with the other of said jaws to secure the grip of said jaws around said neck portion, a charged breech carried in said bore in said lug and adapted to break said lug at said neck portion when fired, means to fire said breech, and a guide and stop member threaded into said housing and adapted to be seated upon said head.

References Cited in the file of this patent

UNITED STATES PATENTS

| 1,339,432 | Barr | May 11, 1920 |
| 2,443,629 | Matuszewski | June 22, 1948 |
| 2,478,019 | Sonntag | Aug. 2, 1949 |
| 2,489,984 | Shoemaker | Nov. 29, 1949 |
| 2,556,672 | Bergh et al. | June 12, 1951 |

FOREIGN PATENTS

| 10,705 | Great Britain | Feb. 26, 1914 |
| 1,232 | Netherlands | May 1, 1916 |
| 233,262 | Great Britain | May 7, 1925 |
| 62,105 | Sweden | Dec. 7, 1926 |
| 404,775 | Great Britain | Jan. 25, 1934 |
| 485,750 | Great Britain | May 24, 1938 |
| 875,291 | France | Sept. 14, 1942 |
| 609,456 | Great Britain | May 9, 1948 |